(12) United States Patent
Minto

(10) Patent No.: US 10,918,981 B2
(45) Date of Patent: Feb. 16, 2021

(54) VALVE

(71) Applicant: MANN+HUMMEL Filtration Technology Group Inc., Gastonia, NC (US)

(72) Inventor: Sheldon A. Minto, Charlotte, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 602 days.

(21) Appl. No.: 15/818,408

(22) Filed: Nov. 20, 2017

(65) Prior Publication Data
US 2018/0140979 A1    May 24, 2018

Related U.S. Application Data

(60) Provisional application No. 62/425,189, filed on Nov. 22, 2016.

(51) Int. Cl.
*B01D 27/10* (2006.01)
*B01D 35/147* (2006.01)
(Continued)

(52) U.S. Cl.
CPC .......... *B01D 35/147* (2013.01); *B01D 29/114* (2013.01); *B01D 29/15* (2013.01); *B01D 35/1475* (2013.01); *F16K 7/14* (2013.01); *F16K 7/17* (2013.01); *F16K 17/0453* (2013.01); *F16K 17/0493* (2013.01); *F16K 31/126* (2013.01); *B01D 27/10* (2013.01); *B01D 27/103* (2013.01); *F16K 17/02* (2013.01); *F16K 17/164* (2013.01)

(58) Field of Classification Search
CPC .... B01D 35/147; B01D 29/15; B01D 29/114; F16K 17/0493; F16K 17/0453; F16K 31/126; F16K 7/14; F16K 7/17
See application file for complete search history.

(56) References Cited

U.S. PATENT DOCUMENTS 4,028,243 A   6/1977 Offer et al.
5,256,280 A * 10/1993 Anderly ................. B01D 27/06
                                                                210/130
(Continued)

FOREIGN PATENT DOCUMENTS

WO    2006012031 A1    2/2006

OTHER PUBLICATIONS

International Search Report and the Written Opinion for PCT/US2017/062114 dated Mar. 8, 2018.

*Primary Examiner* — Angel Olivera
(74) *Attorney, Agent, or Firm* — Honigman LLP

(57) ABSTRACT

A valve includes a deformable portion connected to a rigid portion. A portion of a surface of a frustoconical body of the rigid portion is disposed adjacent a portion of a surface of a frustoconical body of the deformable portion. A portion of a surface of an upper axially-extending portion of the rigid portion is disposed adjacent a portion of a surface of an upper axially-extending portion of the deformable portion. A portion of the surface of the frustoconical body of the deformable portion that is not disposed adjacent a portion of the surface of the frustoconical body of the rigid portion defines a circumferential void. The circumferential void is in fluid communication with a plurality of upstream radial bypass passages extending through the frustoconical body of the rigid portion.

12 Claims, 9 Drawing Sheets

(51) Int. Cl.
*F16K 17/02* (2006.01)
*F16K 17/164* (2006.01)
*F16K 31/126* (2006.01)
*F16K 7/17* (2006.01)
*B01D 29/11* (2006.01)
*B01D 29/15* (2006.01)
*F16K 17/04* (2006.01)
*F16K 7/14* (2006.01)

(56) References Cited

U.S. PATENT DOCUMENTS

2005/0040088 A1 2/2005 Cline
2005/0077220 A1 4/2005 Cline
2010/0000918 A1 1/2010 Crawford

* cited by examiner

VALVE

CROSS REFERENCE TO RELATED APPLICATIONS

This U.S. patent application claims priority under 35 U.S.C. § 119(e) to U.S. Provisional Application 62/425,189, filed on Nov. 22, 2017, the disclosure of which is considered part of the disclosure of this application and is hereby incorporated by reference in its entirety.

TECHNICAL FIELD

This disclosure relates to a valve, and more particularly to a valve configured for use with a filter assembly as a two-piece bypass valve.

BACKGROUND

Various filters are known in the art for filtering fluid as it passes through a fluid path. Filters include, in part, filter media which removes impurities from a fluid, such as, for example, oil or fuel that passes through filter media.

A filter assembly or the filter media associated therewith may be periodically replaced to reduce the potential for developing unacceptably high impedance in a fluid flow path through the filter assembly.

While known filters and methods of using filters have proven to be acceptable for various applications, a need exists for improved filter assemblies and methodologies for using the same that advance the art.

SUMMARY

One aspect of the disclosure provides a filter subassembly. The filter subassembly may include a deformable portion connected to a rigid portion. A portion of a surface of a frustoconical body of the rigid portion may be disposed adjacent a portion of a surface of a frustoconical body of the deformable portion. A portion of a surface of an upper axially-extending portion of the rigid portion may be disposed adjacent a portion of a surface of an upper axially-extending portion of the deformable portion. A portion of the surface of the frustoconical body of the deformable portion that is not disposed adjacent a portion of the surface of the frustoconical body of the rigid portion may define a persistent circumferential void of the filter subassembly. The persistent circumferential void may be in fluid communication with a plurality of upstream radial bypass passages extending through the frustoconical body of the rigid portion.

Implementations of the disclosure may include one or more of the following optional features. For example, in some implementations, an axial passage extends through the rigid portion. Access to the axial passage may be permitted by a lower opening formed by the frustoconical body of the rigid portion and a downstream axial bypass passage formed by the upper axially-extending portion of the rigid portion.

In some implementations, the portion of the surface of the frustoconical body of the rigid portion is a portion of a lower surface of the frustoconical body of the rigid portion. The portion of the surface of the upper axially-extending portion of the rigid portion may be a portion of an inner surface of the upper axially-extending portion of the rigid portion. The portion of the surface of the frustoconical body of the deformable portion may be a portion of an upper surface of the frustoconical body of the deformable portion. The portion of the surface of the upper axially-extending portion of the deformable portion may be a portion of an outer radial surface of the upper axially-extending portion of the deformable portion.

In some examples, the frustoconical body extends radially outwardly from the tube-shaped body. The frustoconical body may demarcate an upper axially-extending portion of the tube-shaped body of the deformable portion.

In some implementations, the tube-shaped body includes an inner radial surface that defines an axial passage extending through the tube-shaped body.

In some examples, the upper axially-extending portion is defined by the outer radial surface and the upper axial surface of the tube-shaped body. The upper axial surface of the tube-shaped body may connect the inner radial surface of the tube-shaped body to the outer radial surface of the upper axially-extending portion.

In some implementations, the frustoconical body is defined by an outer radial surface, a lower axial surface and the upper surface. The outer radial surface may connect the lower axial surface of the frustoconical body to the upper surface of the frustoconical body. The upper surface of the frustoconical body may be connected to the outer radial surface of the upper axially extending portion of the tube-shaped body.

Another aspect of the disclosure provides a filter assembly. The filter assembly may include a tube-shaped body of filter media, an upper end cap, a lower end cap and a subassembly including a deformable portion and a rigid portion. The tube-shaped body of filter media may be defined by an inner radial surface, an outer radial surface, an upper axial surface and a lower axial surface. The inner radial surface may define a passage extending through the tube-shaped body of filter media. The upper end cap may be disposed adjacent the upper axial surface of the tube-shaped body of filter media. The lower end cap may be disposed adjacent the lower axial surface of the tube-shaped body of filter media. A lower axial surface of a frustoconical body of the deformable portion of the subassembly may be disposed adjacent an upper axial surface of the upper end cap.

Implementations of the disclosure may include one or more of the following optional features. For example, in some implementations, the frustoconical body of the deformable portion demarcates a lower axially-extending portion of a tube-shaped body of the deformable portion. An outer radial surface of the lower axially extending portion of the tube-shaped body of the deformable portion may be disposed adjacent an inner radial surface that defines a passage extending through the upper end cap.

In some implementations, the upper axially-extending portion of the tube-shaped body of the deformable portion extends in an axial direction away from the upper end cap.

In some examples, the lower axially-extending portion of the tube-shaped body of the deformable portion extends in an axial direction toward the lower end cap.

Another aspect of the disclosure provides a method. The method may include: clogging filter media of a filter element with impurities for directing unfiltered fluid along a first fluid flow path toward a bypass valve assembly of the filter element that includes a deformable portion that selectively fluidly seals a rigid portion; flowing the unfiltered fluid along the first fluid flow path through a plurality of upstream radial bypass passages formed by the rigid portion of the bypass valve assembly and into a persistent circumferential void defined by a portion of an upper surface of a frustoconical body of the deformable portion that is not disposed adjacent a portion of a lower surface of a frustoconical body of the rigid portion; exerting a sufficient force that arises from the unfiltered fluid flowing along a second fluid flow path upon the portion of the upper surface of the frustoconical body of the deformable portion that is not disposed adjacent the portion of the lower surface of the frustoconical body of the rigid portion for causing a portion of an outer radial surface of an upper axially-extending portion of the deformable portion to deflect radially inwardly and away from a portion of an inner surface of an upper axially-extending portion of the rigid portion for selectively forming of a circumferential bypass void between the portion of the outer radial surface of the upper axially-extending portion of the deformable portion and the portion of the inner surface of the upper axially-extending portion of the rigid portion; and flowing the unfiltered fluid along a third fluid flow path through the selectively-formed circumferential bypass void and out of a downstream axial bypass passage of the rigid portion.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A filter assembly may include, in part, filter media which removes impurities from a fluid, such as, for example, oil or fuel that passes through the filter media. The filter assembly may also include an upper end cap and a lower end cap. A subassembly of the filter assembly may be disposed upon the upper end cap. The subassembly may include a deformable portion and a rigid portion. In the event that the filter media is clogged with impurities filtered from the fluid, the fluid may flow through the subassembly thereby permitting the fluid to bypass the clogged filter media.

Figure 1:
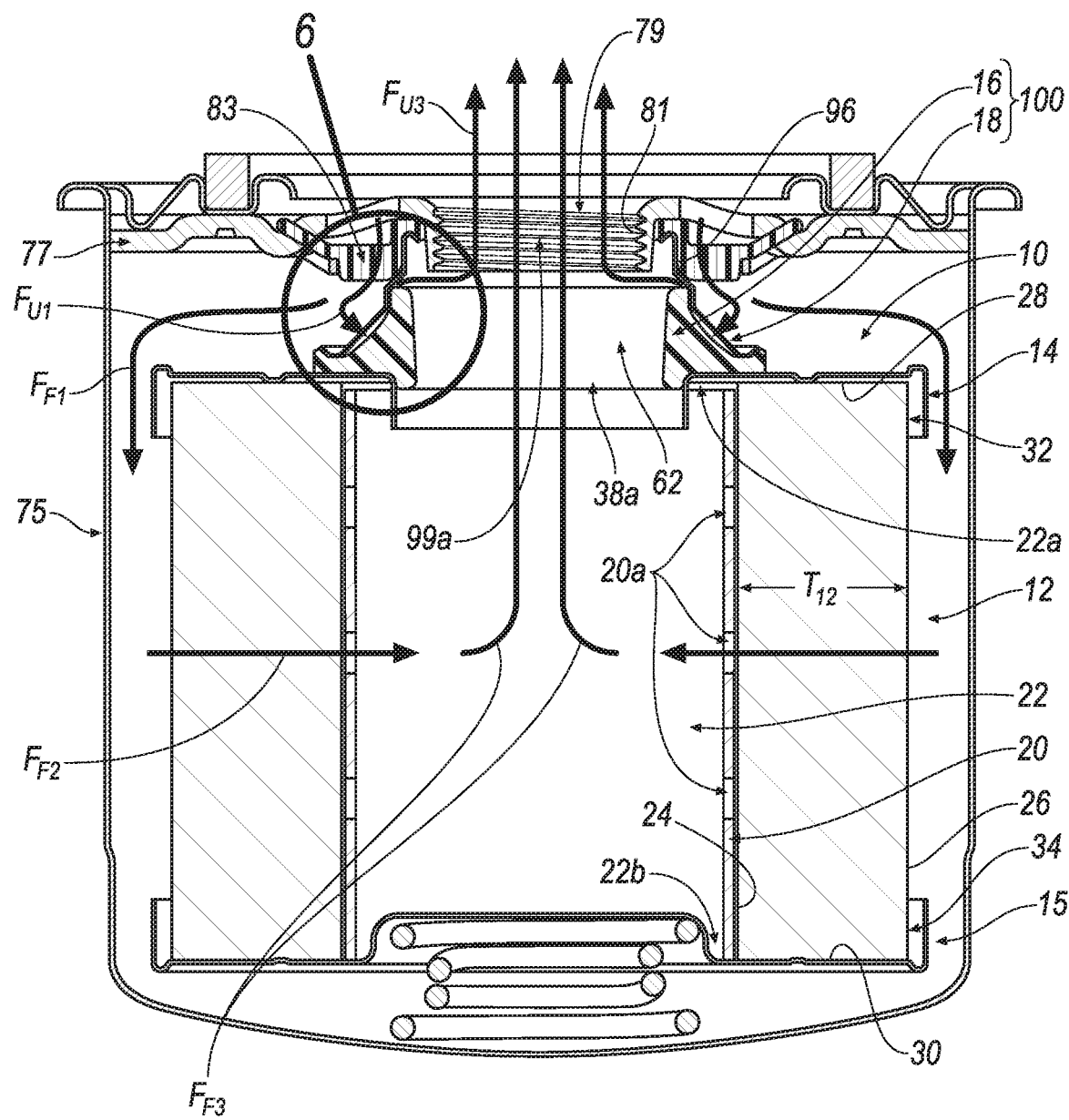
FIG. 1 is a cross-sectional view of a filter assembly disposed within a housing in accordance with the principles of the present disclosure.
Figure 2:
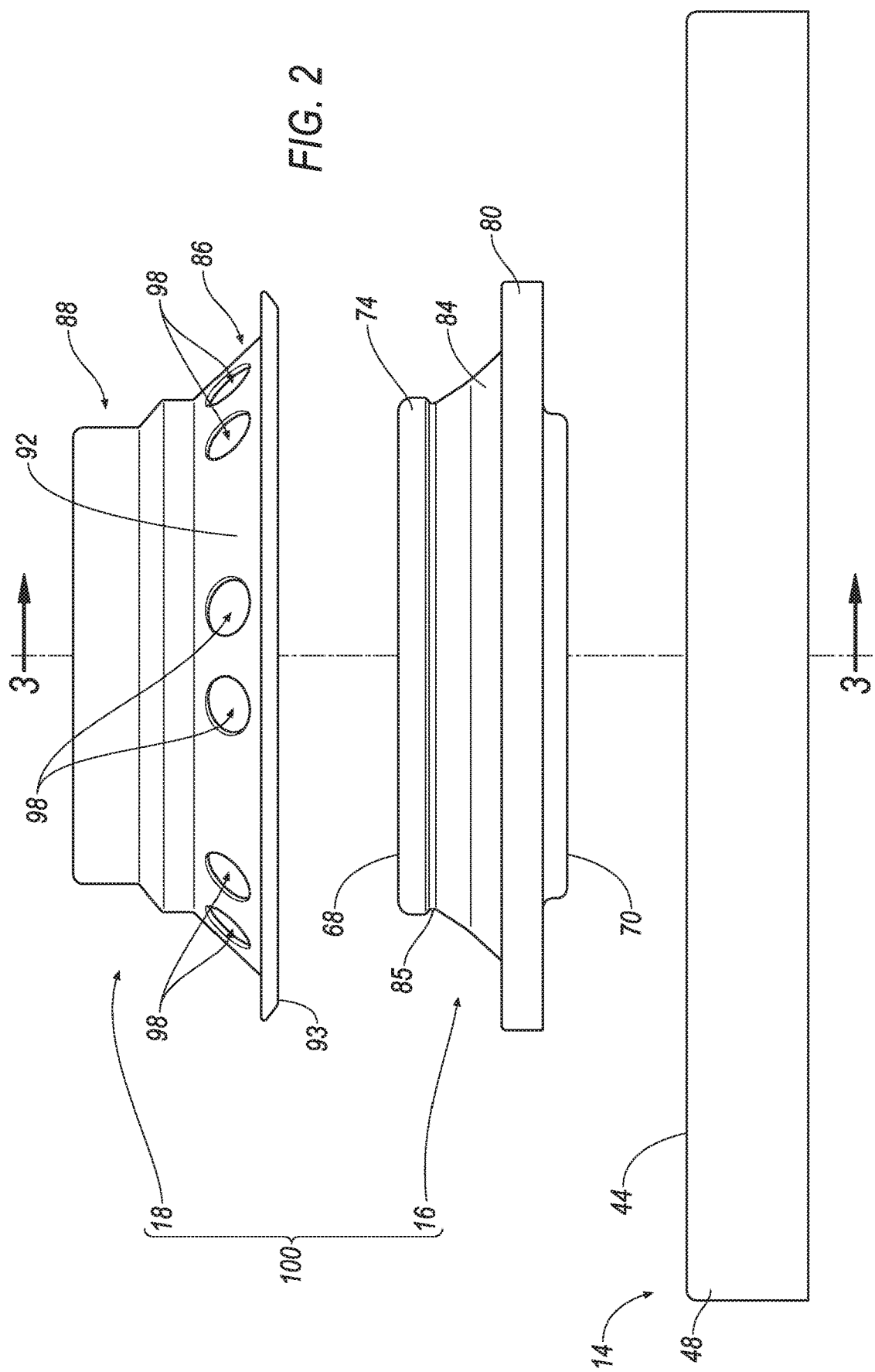
FIG. 2 is an exploded side view of a deformable portion, a rigid portion and an upper end cap of the filter assembly of FIG. 1.

Referring to FIG. 1, an exemplary filter assembly is shown generally at 10. The filter assembly 10 includes filter media 12, an upper end cap 14, a lower end cap 15, a deformable portion 16 and a rigid portion 18. The deformable portion 16 may be made from any desirable material such as silicone, for example, or any other elastomeric material. The rigid portion 18 may be made from any desirable material such as, for example, a plastic or metal material. As seen in FIGS. 1-6C, the deformable portion 16 and the rigid portion 18 define a subassembly 100 of the filter assembly 10, which may be alternatively referred to as a bypass valve assembly.

Figure 3:
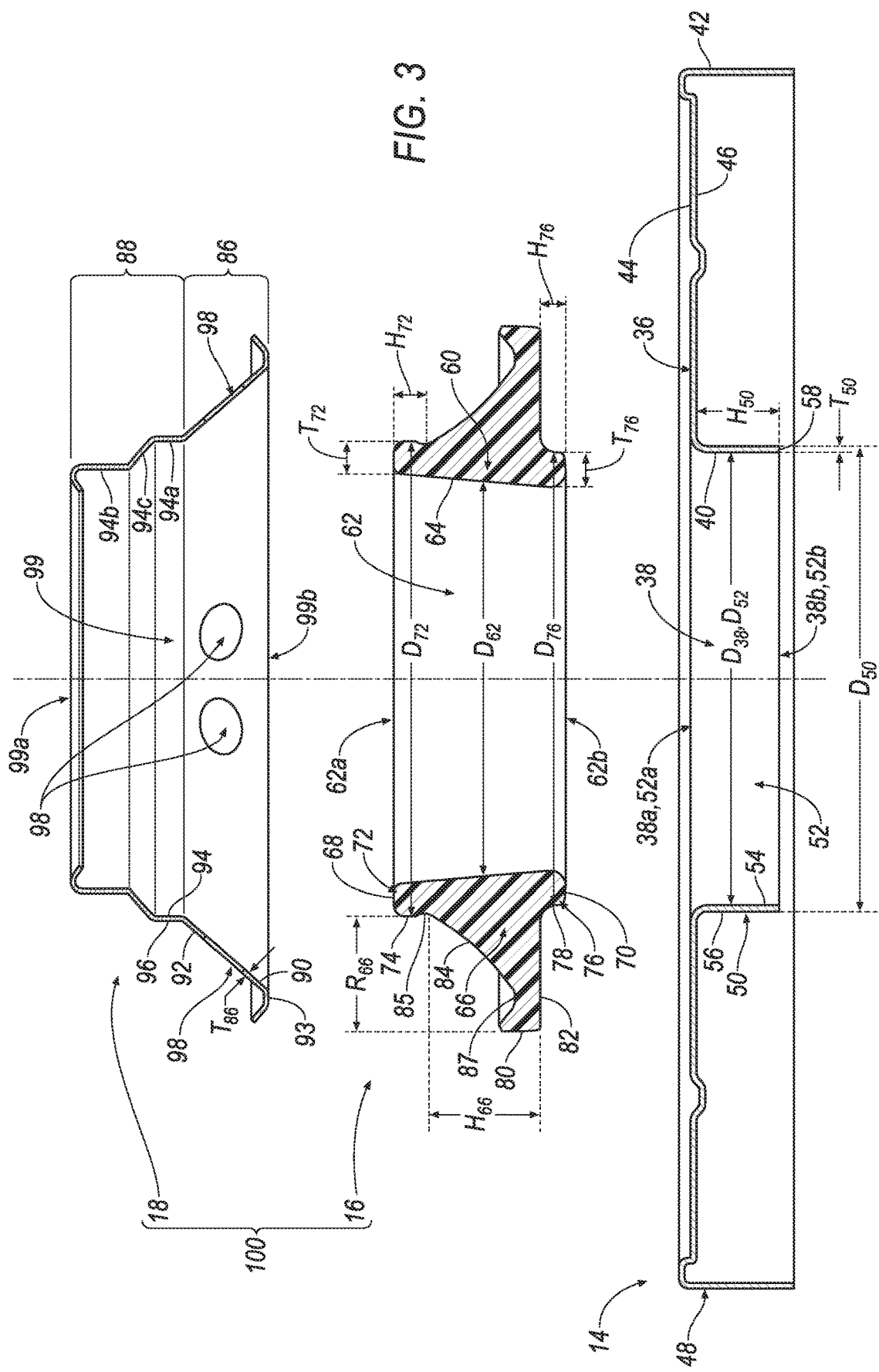
FIG. 3 is a cross-sectional view of the deformable portion, the rigid portion and the upper end cap of the filter assembly of FIG. 1 according to line 3-3 of FIG. 2.
Figure 4:
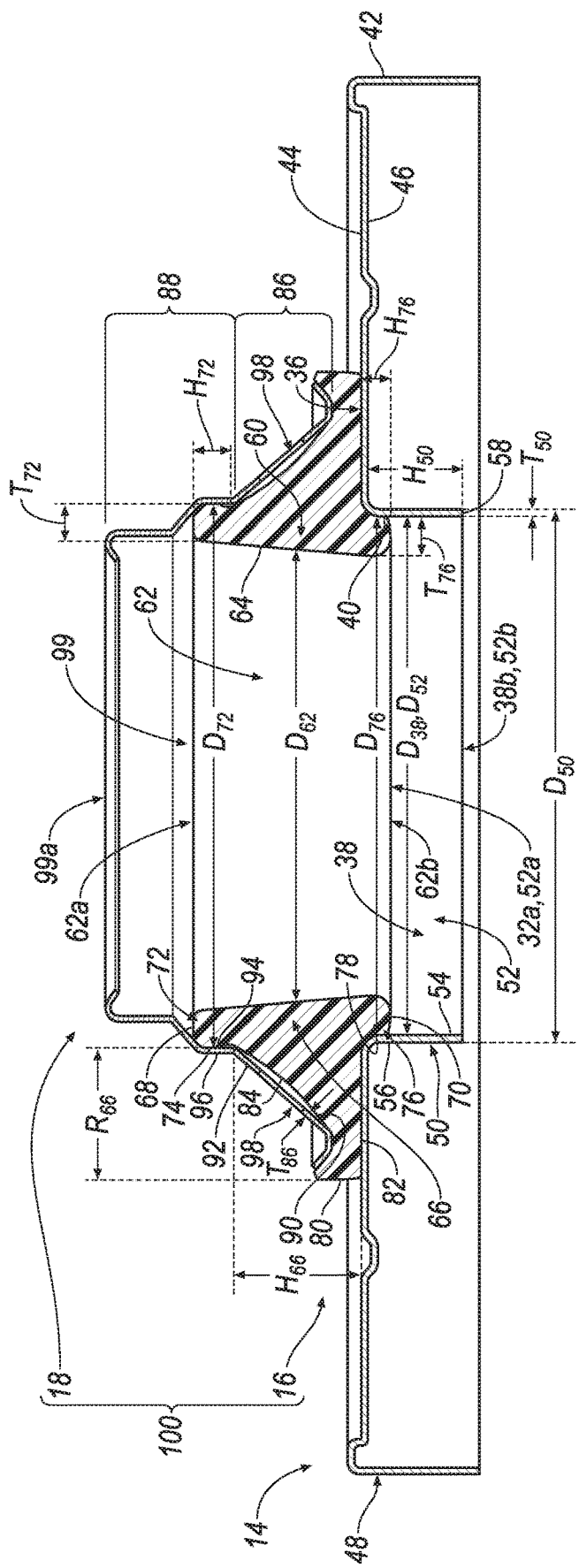
FIG. 4 is a cross-sectional view of the deformable portion, the rigid portion and the upper end cap of the filter assembly according to FIG. 3 illustrating the deformable portion, the rigid portion and the upper end cap arranged in an assembled orientation.
Figure 5:
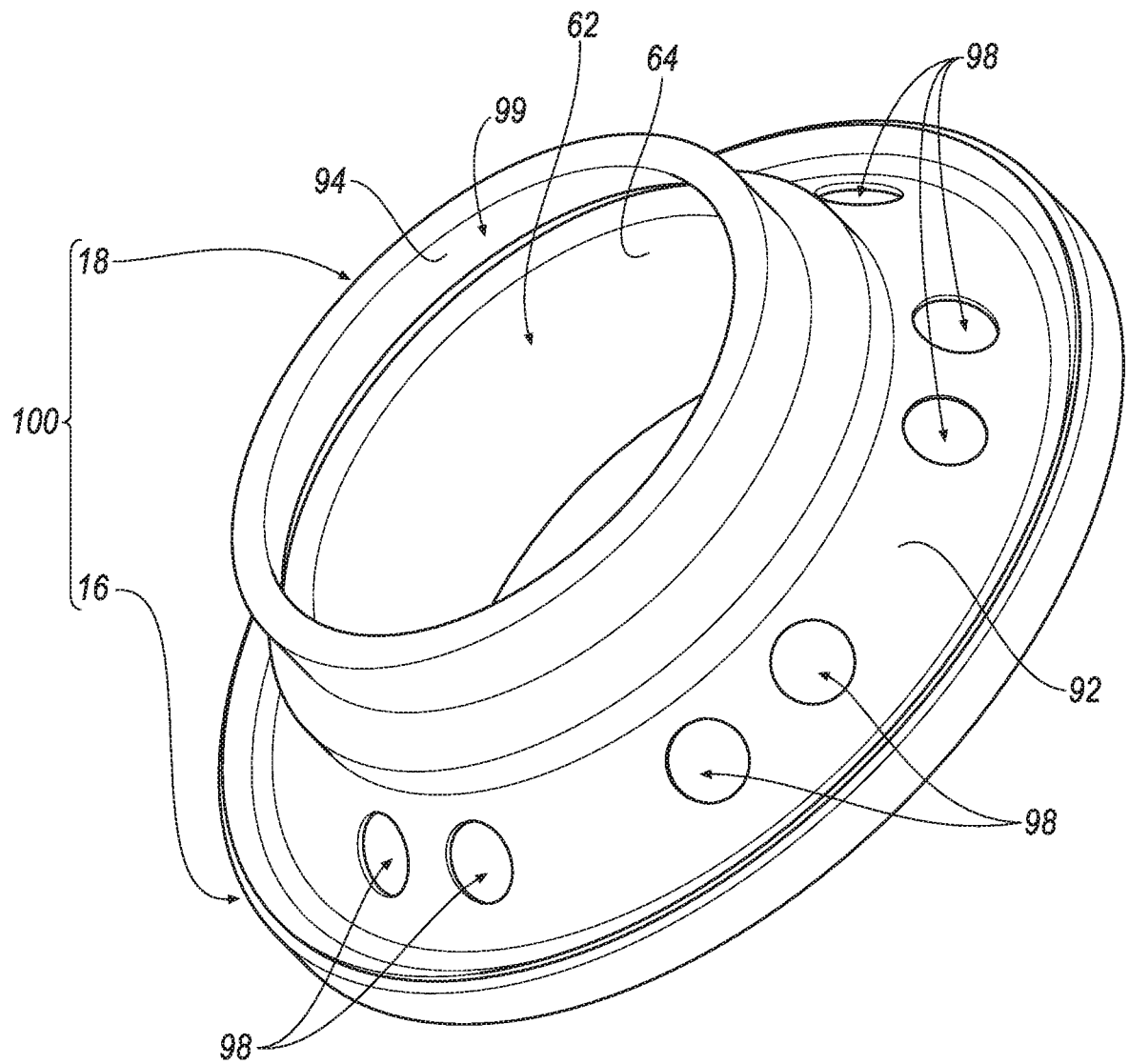
FIG. 5 is a top perspective view of the deformable portion and the rigid portion of FIG. 4.

As seen in FIGS. 3-4, one or more surfaces (see e.g., 68, 74, 84) of the deformable portion 16 may be connected to one or more surfaces (see, e.g., 90, 92, 84) of the rigid portion 18 using one or more of an adhesive and a friction-fit configuration. Furthermore, one or more surfaces (see, e.g., 70, 78, 82) of the deformable portion 16 may be connected to one or more surfaces (see, e.g., 40, 44, 54) of the upper end cap 14.

As seen in FIG. 1, the filter media 12 may include any desirable geometry such as, for example, a tube-shaped body. The filter assembly 10 may optionally include a center tube 20 disposed within a passage 22 defined by an inner axially-extending surface 24 of the tube-shaped body of the filter media 12. The tube-shaped body of the filter media 12 may include an outer axially-extending surface 26, an upper radially-extending surface 28 and a lower radially-extending surface 30. Access to the passage 22 may be permitted by an upper opening 22a formed by the upper radially-extending surface 28 or a lower opening 22b formed by the lower radially-extending surface 30.

Both of the upper radially-extending surface 28 and the lower radially-extending surface 30 connect the inner axially-extending surface 24 to the outer axially-extending surface 26. The upper radially-extending surface 28 and a portion of each of the inner axially-extending surface 24 and the outer axially-extending surface 26, extending from the upper radially-extending surface 28, generally defines an upper end 32 of the tube-shaped body. The lower radially-extending surface 30 and a portion of each of the inner axially-extending surface 24 and the outer axially-extending surface 26, extending from the lower radially-extending surface 30, generally defines a lower end 34 of the tube-shaped body.

The center tube 20 may be disposed within the passage 22 and directly adjacent the inner axially-extending surface 24 of the tube-shaped body of the filter media 12. The center tube 20 may rigidify the tube-shaped body of the filter media 12. The center tube 20 may also include a plurality of passages 20a extending through the inner axially-extending surface 24 and the outer axially-extending surface 26.

The plurality of passages 20a permits fluid flow (see, e.g., fluid-flow path $F_{F2}$): (1) from the outer axially-extending surface 26 of the tube-shaped body of the filter media 12; (2) through a radially-extending thickness dimension $T_{12}$ of the tube-shaped body of the filter media 12; (3) out of the inner axially-extending surface 24 of the tube-shaped body of the filter media 12; (4) through the plurality of passages 20a of the center tube 20; and (5) into the passage 22 formed by the tube-shaped body of the filter media 12. In some implementations, one or more of the passages 20a extends in a radial direction through the outer axially-extending surface 26 and the inner axially-extending surface such that the fluid-flow path $F_{F2}$ permits fluid flow in a radially-extending direction.

Referring to FIG. 3, the upper end cap 14 may include any desirable geometry such as, for example, a tube-shaped body 36 having a passage 38 defining a passage diameter $D_{38}$ extending there-through. The passage 38 is defined by an inner axially-extending surface 40 of the tube-shaped body 36. The tube-shaped body 36 may also include an outer axially-extending surface 42, an upper radially-extending surface 44 and a lower radially-extending surface 46. Access to the passage 38 is permitted by an upper opening 38a and a lower opening 38b.

A first ring-shaped body 48 extends from the tube-shaped body 36 of the upper end cap 14. The first ring-shaped body 48 extends axially away from the lower radially-extending surface 46 of the tube-shaped body 36 toward the lower end cap 15. In some implementations, the first ring-shaped body 48 extends substantially perpendicularly from the lower radially-extending surface 46 of the tube-shaped body 36 toward the lower end cap 15.

A second ring-shaped body 50 extends from the tube-shaped body 36 of the upper end cap 14. The second ring-shaped body 50 extends axially away from the lower radially-extending surface 46 of the tube-shaped body 36 toward the lower end cap 15. In some implementations, the second ring-shaped body 50 extends substantially perpendicularly from the lower radially-extending surface 46 of the tube-shaped body 36 toward the lower end cap 15.

The second ring-shaped body 50 is defined by an outer diameter $D_{50}$, a height dimension $H_{50}$ and a radial thickness dimension $T_{50}$. The height dimension $H_{50}$ may be greater than the radial thickness dimension $T_{50}$.

A passage 52 defined by a passage diameter $D_{52}$ extends through the second ring-shaped body 50 and is defined by an inner axially-extending surface 54 of the second ring-shaped body 50. The second ring-shaped body 50 is also defined by an outer axially-extending surface 56 and a radially-extending surface 58 that connects the inner axially-extending surface 54 to the outer axially-extending surface 56.

Access to the passage 52 is permitted by an upper opening 52a and a lower opening 52b. Both of the upper opening 52a and the lower opening 52b may be defined by a dimension that is approximately equal to the diameter dimension $D_{52}$ of the passage 52 extending through the second ring-shaped body 50. The second ring-shaped body 50 extends axially away from the lower radially-extending surface 46 of the tube-shaped body 36 of the upper end cap 14 at a distance approximately equal to the height dimension $H_{50}$ of the second ring-shaped body 50.

The outer axially-extending surface 56 of the second ring-shaped body 50 is connected to and may extend substantially perpendicularly from the lower radially-extending surface 46 of the tube-shaped body 36. The inner axially-extending surface 54 of the second ring-shaped body 50 is connected to and is aligned with the inner axially-extending surface 40 of the tube-shaped body 36. The passage 52 extending through the second ring-shaped body 50 is axially aligned with and is in fluid communication with the passage 38 extending through the tube-shaped body 36 of the upper end cap 14 by way of the lower opening 38b of the passage 38 extending through the tube-shaped body 36 of the upper end cap 14.

Referring to FIG. 3, the deformable portion 16 may include any desirable geometry such as, for example, a tube-shaped body 60. An axial passage 62 defined by a passage diameter $D_{62}$ extends through the tube-shaped body 60 and is defined by an inner axially-extending surface 64 of the tube-shaped body 60. A frustoconical body 66 is integral with and extends radially outwardly from the tube-shaped body 60. The tube-shaped body 60 also defines an upper radially-extending surface 68 and a lower radially-extending surface 70. Access to the passage 62 is permitted by an upper opening 62a formed by the upper radially-extending surface 68 and a lower opening 62b defined by the lower radially-extending surface 70.

The frustoconical body 66 may demarcate an upper axially-extending portion 72 of the tube-shaped body 60. The upper axially-extending portion 72 extends axially away from the tube-shaped body 60 in a direction away from the upper end cap 14. In some implementations, the upper axially-extending portion 72 extends substantially perpendicularly from the tube-shaped body 60 in a direction away from the upper end cap 14.

The upper axially-extending portion 72 is defined by an outer diameter $D_{72}$, a height dimension $H_{72}$ and a radial thickness dimension $T_{72}$. The upper axially-extending portion 72 is also defined by an outer axially-extending surface 74 and the upper radially-extending surface 68 of the tube-shaped body 60. The upper radially-extending surface 68 of the tube-shaped body 60 connects the inner axially-extending surface 64 of the tube-shaped body 60 to the outer axially-extending surface 74 of the upper axially-extending portion 72. The upper radially-extending surface 68, the inner axially-extending surface 64, and the outer axially-extending surface 74 may extend annularly about the tube-shaped body 60.

The frustoconical body 66 may also demarcate a lower axially-extending portion 76 of the tube-shaped body 60 of the deformable portion 16. The lower axially-extending portion 76 extends axially away from the tube-shaped body 60 in a direction toward the upper end cap 14. In some implementations, the lower axially-extending portion 76 extends substantially perpendicularly from the tube-shaped body 60 in a direction toward the upper end cap 14.

The lower axially-extending portion 76 is defined by an outer diameter $D_{76}$, a height dimension $H_{76}$ and a radial thickness dimension $T_{76}$. The lower axially-extending portion 76 is also defined by an outer axially-extending surface 78 and the lower radially-extending surface 70 of the tube-shaped body 60. The lower radially-extending surface 70 of the tube-shaped body 60 connects the inner axially-extending surface 64 of the tube-shaped body 60 to the outer axially-extending surface 78 of the lower axially-extending portion 76. The lower radially-extending surface 70 and the outer axially-extending surface 78 may extend annularly about the tube-shaped body 60.

The frustoconical body 66 extends radially away from the outer axially-extending surface 74, 78 of both of the upper axially-extending portion 72 and the lower axially-extending portion 76 of the tube-shaped body 60. In some implementations, the frustoconical body 66 extends substantially perpendicularly from the outer radial surface 74, 78 of both of the upper axially-extending portion 72 and the lower axially-extending portion 76 of the tube-shaped body 60 of the deformable portion 16.

The frustoconical body 66 extends away from the outer radial surface 74, 78 of both of the upper axially-extending portion 72 and the lower axially-extending portion 76 at a radial distance $R_{66}$. The frustoconical body 66 is also defined by a height dimension $H_{66}$.

The frustoconical body 66 is also defined by an outer axially-extending surface 80, a lower radially-extending surface 82 and an upper surface 84. The upper surface 84 extends in a direction transverse to both the axially-extending direction and the radially-extending direction. In some implementations, the upper surface 84 may include a concave profile extending annularly about the frustoconical body 66. The outer axially-extending surface 80 connects the lower radially-extending surface 82 to the upper surface 84. The outer axially-extending surface 80, the lower radially-extending surface 82, and the upper surface 84 may extend annularly about the tube-shaped body 60.

The lower radially-extending surface 82 of the frustoconical body 66 is connected to the outer axially-extending surface 78 and to the outer axially-extending surface 80 of the lower axially-extending portion 76. The outer axially-extending surface 80 is connected to the upper surface 84. In some implementations, the outer axially-extending surface 80 and the upper surface 84 define a lower groove or channel 87 extending therebetween. In this regard, the channel 87 may extend axially downward relative to at least a portion of the both the outer axially-extending surface 80 and the upper surface 84. In particular, the channel 87 may be defined by a concave portion of the upper surface 84. The channel 87 may extend annularly about the deformable portion 16. The upper surface 84 of the frustoconical body 66 is connected to the outer axially-extending surface 74 of the upper axially extending portion 72. In some implementations, the outer axially-extending surface 74 and the upper surface 84 may define an upper groove or channel 85 extending therebetween. In this regard, the channel 85 may extend radially inward relative to at least a portion of the both the outer axially-extending surface 74 and the upper surface 84. In particular, the channel 85 may be defined by a concave portion of the upper surface 84. The channel 85 may extend annularly about the deformable portion 16.

Figure 7:
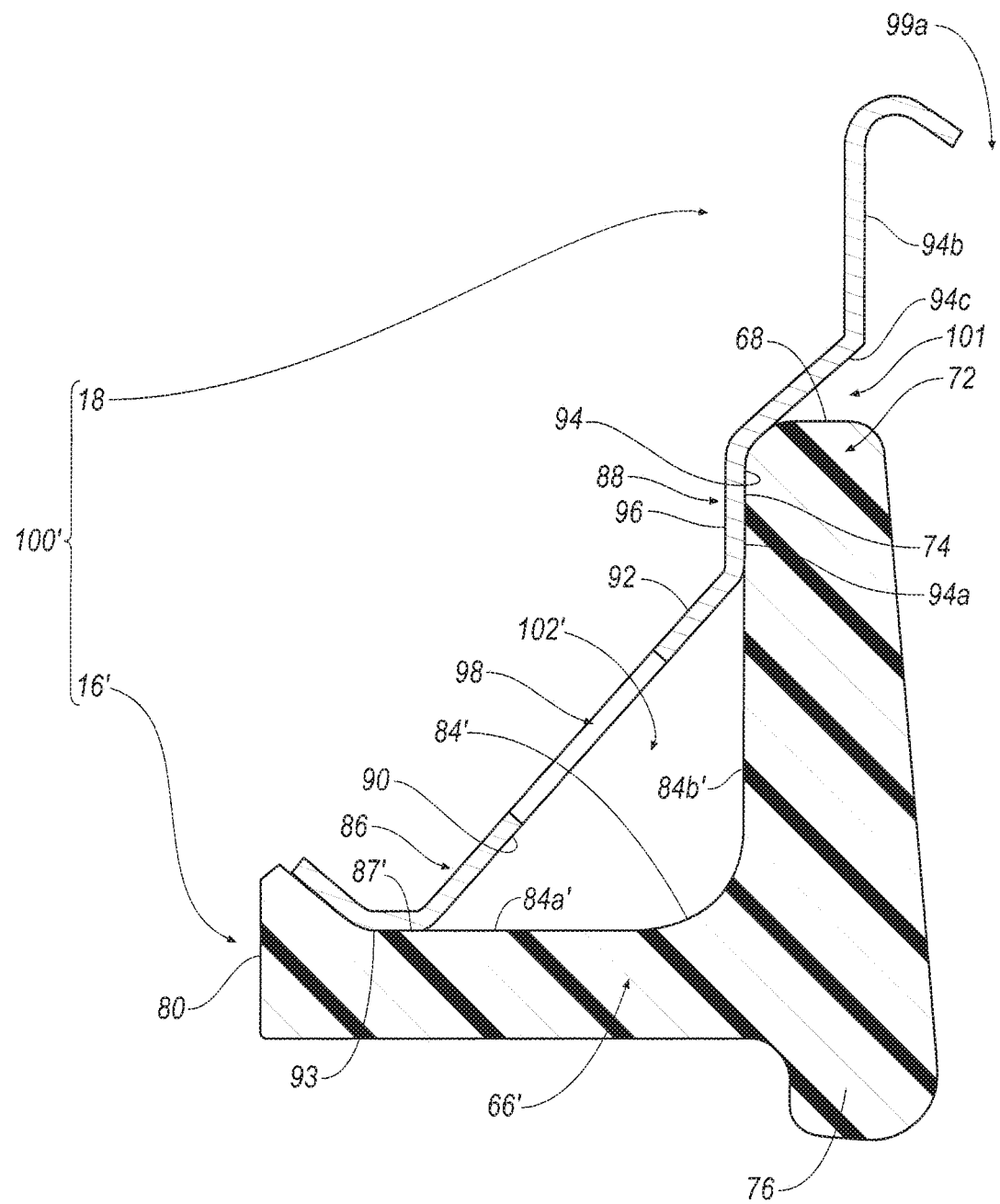
FIG. 7 is an enlarged view of another portion of a filter assembly in accordance with the principles of the present disclosure.

With reference to FIG. 7, another bypass valve assembly 100', including a deformable portion 16', configured for use with the filter assembly 10 is illustrated. The bypass valve assembly 100' may be substantially similar to the bypass valve assembly 100, except as otherwise shown and described herein. Accordingly, like reference numerals are used hereinafter and in the drawings to identify like components. An upper surface 84' of the body 66' of the deformable portion 16' includes a radially-extending portion 84a' and an axially-extending portion 84b' extending from the radially-extending portion, such that the radially- and axially-extending portions define an L-shaped profile extending annularly about the frustoconical body 66'. The outer axially-extending surface 80 and the radially-extending portion 84a' of the upper surface 84' may define a lower groove or channel 87' extending therebetween.

With continued reference to FIG. 3, the rigid portion 18 may include any desirable geometry defined by, for example, a frustoconical body 86 and an upper axially-extending portion 88 integrally and monolithically formed with the frustoconical body 86. The frustoconical body 86 is defined by a lower surface 90 and an upper surface 92 opposing the lower surface 90. The lower surface 90 and the upper surface 92 each extend in a direction transverse to both the axially-extending direction and the radially-extending direction. In some implementations, the lower surface 90 may include a concave profile extending annularly about the rigid portion 18. In some implementations, the upper surface 92 may be substantially parallel to the lower surface 90. The lower surface 90 may further include, and/or otherwise define, a lower annular rim 93. The lower annular rim 93 may include a convex profile.

The upper axially-extending portion 88 is defined by an inner surface 94 and an outer surface 96 opposing the inner surface 94. The inner surface 94 may include a lower axially-extending portion 94a, an upper axially-extending portion 94b, and a frustoconical portion 94c extending from the lower axially-extending portion 94a to the upper axially-extending portion 94b.

The frustoconical body 86 is also defined by a thickness $T_{86}$ extending between the lower surface 90 and the upper surface 92. A plurality of upstream bypass passages 98 extend through the lower surface 90, the upper surface 92, and the thickness $T_{86}$ of the frustoconical body 86. A cumulative area of the bypass passages 98 may be between 10% and 45% of a surface area of the upper surface 84. In some implementations, the cumulative area of the bypass passages 98 may be substantially equal to 30% of the surface area of the upper surface 84, where the area of each bypass passage 98 is measured in a direction extending substantially parallel to the upper surface 84.

An axial passage 99 extends through the rigid portion 18. Access to the axial passage 99 is permitted by (i) an upper opening 99a formed by the upper axially-extending portion 88 and (ii) a lower opening 99b formed by the frustoconical body 86. The upper opening 99a also forms a downstream axial bypass passage formed by the upper axially-extending portion 88 of the rigid portion 18.

Referring to FIG. 4, in an assembled configuration, the lower radially-extending surface 82 of the frustoconical body 66 is disposed adjacent the upper radially-extending surface 44 of the tube-shaped body 36 of the upper end cap 14. Furthermore, the outer axially-extending surface 78 of the lower axially-extending portion 76 of the tube-shaped body 60 is disposed adjacent the inner axially-extending surface 40 of the tube-shaped body 36 of the upper end cap 14.

Figure 6A:
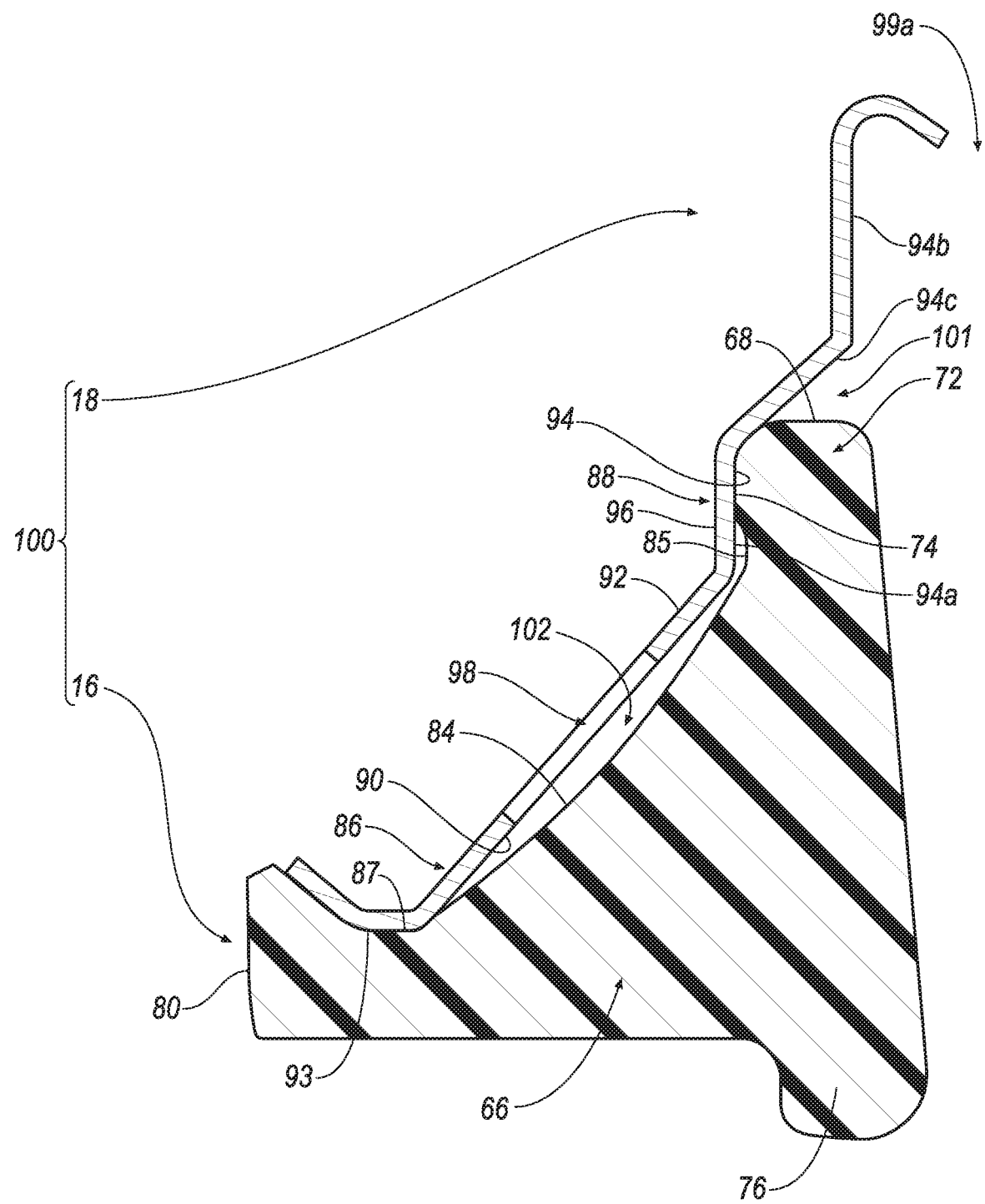
FIG. 6A is an enlarged view of a portion of the filter assembly of FIG. 1 referenced from line 6 of FIG. 1 illustrating a method of use in accordance with the principles of the present disclosure.

Referring to FIGS. 4 and 6A, the deformable portion 16 may be arranged partially adjacent the rigid portion 18 for forming the filter subassembly or the bypass valve assembly 100. As will be described in the following disclosure and as seen at FIGS. 1 and 6A-6C, the arrangement of the deformable portion 16 partially adjacent the rigid portion 18 permits the material defining the deformable portion 16 to selectively sealingly engage the rigid portion 18.

In an example, as seen in FIGS. 4 and 6A, a portion of the lower surface 90 of the frustoconical body 86 of the rigid portion 18 is disposed adjacent at least a portion of the upper surface 84 of the frustoconical body 66 of the deformable portion 16. In particular, in some configurations, the lower annular rim 93 may be disposed within, and/or otherwise engage, the channel 87. A portion of the inner surface 94 of the upper axially-extending portion 88 of the rigid portion 18 is disposed adjacent at least a portion the outer axially-extending surface 74 of the upper axially-extending portion 72 of the deformable portion 16. In particular, in some implementations, a lower portion of the lower axially-extending portion 94a of the lower surface 94 may oppose the channel 85, an upper portion of the lower axially-extending portion 94a may oppose and/or engage the outer axially-extending surface 74, and a lower portion of the frustoconical portion 94c may oppose and/or engage at least a portion of the outer axially-extending surface 74 and/or the upper radially-extending surface 68. An upper portion of the frustoconical portion 94c and at least a portion of the upper radially-extending surface 98 may define a frustoconical void 101 therebetween. The frustoconical void 101 may be in fluid communication with the axial passage 62 of the deformable portion 16 and with the upper opening 99a of the rigid portion 18.

As seen more clearly in FIG. 6A, a portion of the upper surface 84 of the frustoconical body 66 of the deformable portion 16 that is not disposed adjacent a portion of the lower surface 90 of the frustoconical body 86 of the rigid portion 18 in order to define a persistent circumferential void 102 of the filter subassembly/bypass valve assembly 100. In this regard, as previously described, the lower surface 90 and/or the upper surface 84 may include an annularly-extending concave profile defining the persistent circumferential void 102. Similarly, as seen more clearly in FIG. 7, the upper surface 84' (FIG. 7) may include an annularly-extending L-shaped profile defining the persistent circumferential, frustoconically-shaped void 102'. The persistent circumferential void 102, 102' is in fluid communication with the plurality of upstream bypass passages 98 extending through the thickness $T_{86}$ of the frustoconical body 86.

Referring back to FIG. 1, the filter assembly 10 is shown disposed within a housing 75. The housing 75 includes a nutplate 77 having an axial passage 79 defined by a threaded surface 81. The outer surface 96 of the upper axially-extending portion 88 of the rigid portion 18 is connected to a portion 83 of the nutplate 77 in a fluidly-sealed relationship.

When the housing 75 is connected to an engine mount head (not shown) by the threaded surface 81, a fluid is permitted to flow: (1) from the engine mount head and into a void (see fluid-flow paths $F_{F1}$, $F_{U1}$) between the housing 75 and the filter assembly 10; (2) through (see fluid-flow paths $F_{F2}$, $F_{U2}$ (see, e.g., FIG. 6C)) the filter assembly 10; and out of (see fluid-flow paths $F_{F3}$, $F_{U3}$) the filter assembly 10 back to the engine mount head.

The fluid-flow path shown generally at $F_{F1}$ defines a flow path of an unfiltered fluid flowing within the housing 75 and toward the outer radial surface 26 of the tube-shaped body of the filter media 12. The fluid-flow path shown generally at $F_{F2}$ defines a flow path of the unfiltered fluid flowing through the tube-shaped body of the filter media 12 from the outer radial surface 26 of the tube-shaped body of the filter media 12 to the inner radial surface 24 of the tube-shaped body of filter media 12. By permitting the unfiltered fluid to flow through the tube-shaped body of filter media 12, impurities are removed from the fluid such that the fluid emerging from the inner radial surface 24 of the tube-shaped body of filter media 12 is no longer unfiltered fluid, but, rather, filtered fluid.

The fluid-flow path shown generally at $F_{F3}$ defines filtered fluid flowing from the inner radial surface 24 of the tube-shaped body of the filter media 12 and into the passage 22 defined by the inner radial surface 24 of the tube-shaped body of the filter media 12. The filtered fluid flowing along the fluid-flow path $F_{F3}$ then flows: (1) through the upper passage 38a formed by the upper end cap 14; (2) through the axial passage 62 formed by the deformable portion 16; (3) through the downstream axial bypass passage 99a formed by the rigid portion 18; and (4) through the axial passage 79 defined by the threaded surface 81 of the nutplate 77 and back to the engine mount head.

Figure 6B:
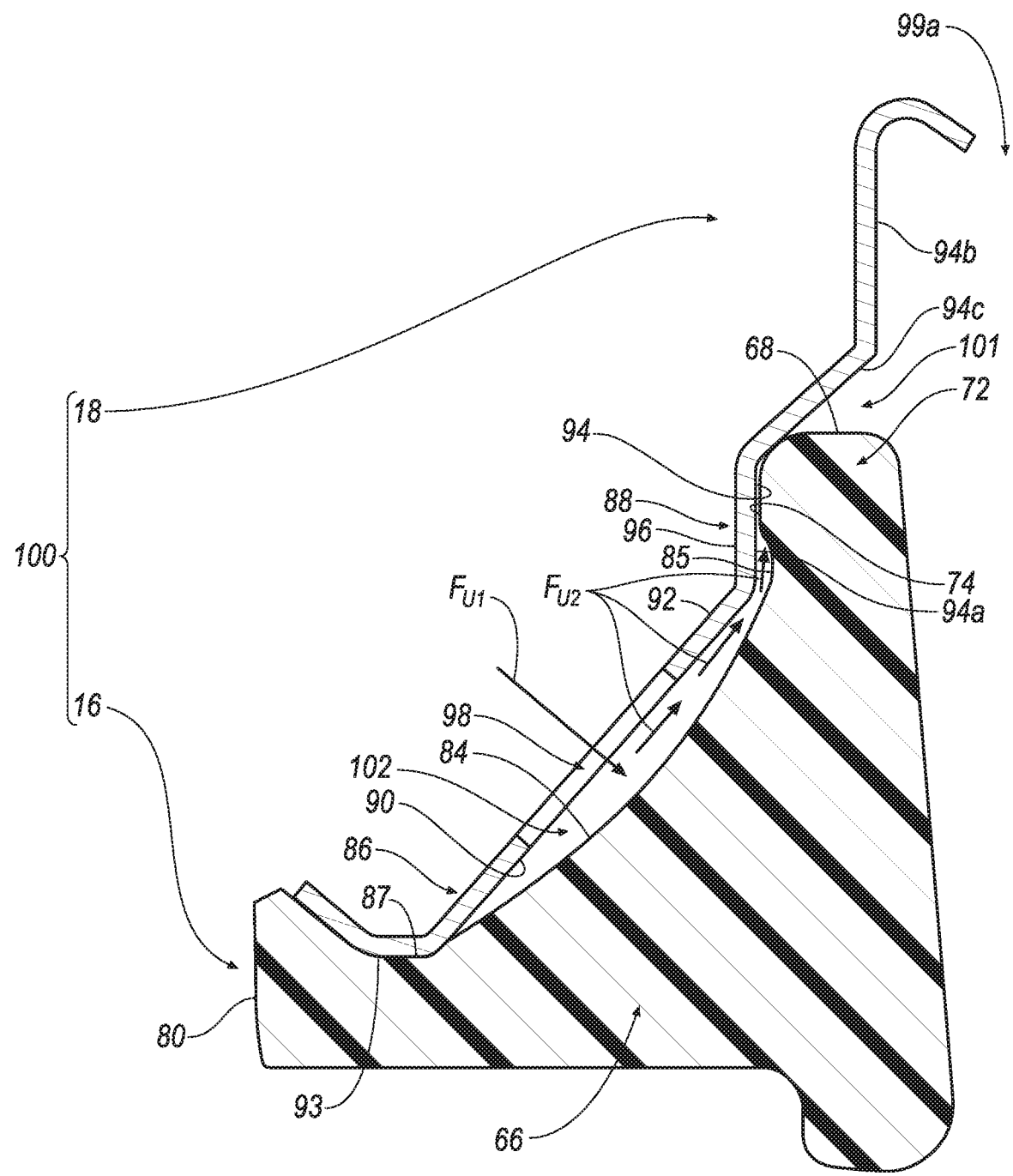
FIG. 6B is another enlarged view of the deformable portion and the rigid portion according to FIG. 6A illustrating a method of use in accordance with the principles of the present disclosure.
Figure 6C:
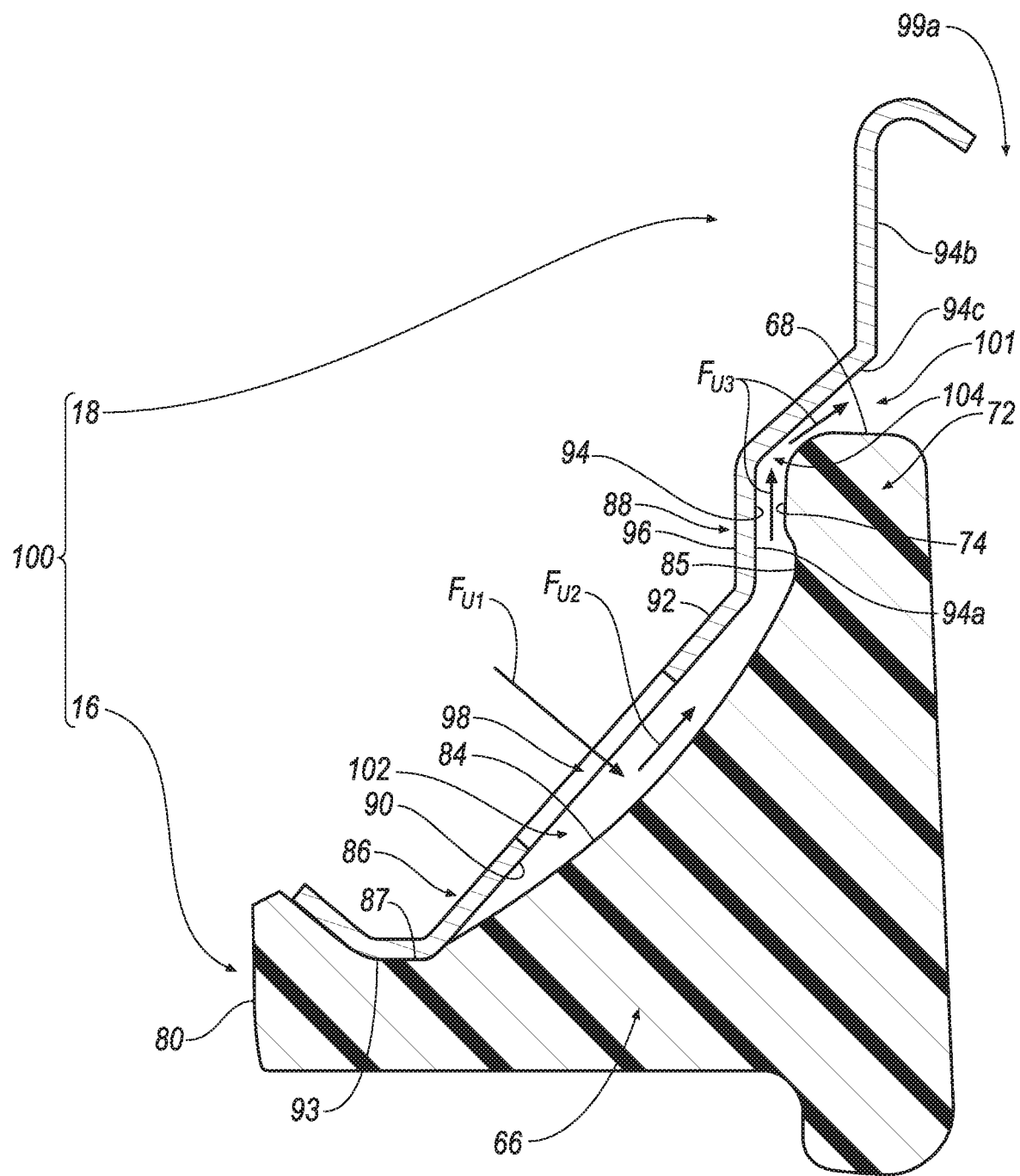
FIG. 6C is another enlarged view of the deformable portion and the rigid portion according to FIG. 6B illustrating a method of use in accordance with the principles of the present disclosure.

Regarding the fluid-flow paths $F_{U1}$, $F_2$, $F_{U3}$ illustrated in FIGS. 6B-6C, when the tube-shaped body of the filter media 12 eventually becomes clogged with impurities as a result of the fluid flowing along the fluid-flow path $F_{F2}$, the fluid-flow path shown generally at $F_{U1}$ defines a flow path of the unfiltered fluid flowing through the plurality of upstream radial bypass passages 98 formed by the rigid portion 18 and into the persistent circumferential void 102 defined by the portion of the upper surface 84 of the frustoconical body 66 of the deformable portion 16 that is not disposed adjacent the portion of the lower surface 90 of the frustoconical body 86 of the rigid portion 18.

Once the unfiltered fluid exerts a sufficient force upon the portion of the upper surface 84 of the frustoconical body 66 of the deformable portion 16 that is not disposed adjacent the portion of the lower surface 90 of the frustoconical body 86 of the rigid portion 18, a fluid-flow path shown generally at $F_{U2}$ (see, e.g., FIGS. 6B-6C) allows the unfiltered fluid further flowing into the persistent circumferential void 102 to cause a portion (see, e.g., the portion of the outer radial surface 74 of the upper axially-extending portion 72 of the deformable portion 16) of the deformable portion 16 to deflect radially inwardly and away from a portion (see, e.g., the portion of the inner surface 94 of the upper axially-extending portion 88 of the rigid portion 18) of the rigid portion 18 for subsequent selective formation of a circumferential bypass void 104 (see, e.g., FIG. 6C) between the portion of the outer radial surface 74 and the portion of the inner surface 94. The unfiltered fluid flows along a fluid flow path $F_{U3}$ (see, e.g., FIG. 6C) through the circumferential bypass void 104 that is selectively formed by forces imparted by the unfiltered fluid upon the filter subassembly/bypass valve assembly 100.

Once the circumferential bypass void 104 is selectively formed, the circumferential bypass void 104 and the persistent circumferential void 102 collectively permit the plurality of upstream radial bypass passages 98 of the rigid portion 18 to be in fluid communication with the downstream axial bypass passage 99a of the rigid portion 18 such that the unfiltered fluid is permitted to flow along the fluid flow paths $F_{U1}$, $F_{U2}$, $F_{U3}$ through the filter subassembly/bypass valve assembly 100. Therefore, when the tube-shaped body of the filter media 12 eventually becomes clogged with impurities, unfiltered fluid is permitted to flow: (1) through the plurality of upstream radial bypass passages 98 formed by the rigid portion 18; (2) through the persistent circumferential void 102 formed by the opposing surfaces 84, 90 of the deformable portion 16 and the rigid portion 18; (3) through the circumferential bypass void 104 that is selectively formed by a radial inwardly deflection of a portion of a portion of the surface 74 of the deformable portion 16 away from a portion of the surface 94 of the rigid portion 18; (4) through the downstream axial bypass passage 99a formed by the rigid portion 18; and (5) through the axial passage 79 defined by the threaded surface 81 of the nutplate 77 and back to the engine mount head thereby permitting the unfiltered fluid to bypass the clogged tube-shaped body of the filter media 12.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A valve comprising:
    a deformable portion connected to a rigid portion, a portion of a surface of a frustoconical body of the rigid portion disposed adjacent a portion of a surface of a frustoconical body of the deformable portion, a portion of a surface of an upper axially-extending portion of the rigid portion disposed adjacent a portion of a surface of an upper axially-extending portion of the deformable portion, a portion of the surface of the frustoconical body of the deformable portion and a portion of the surface of the frustoconical body of the rigid portion defining a void in fluid communication with a plurality of upstream radial bypass passages extending through the frustoconical body of the rigid portion.

2. The valve of claim 1, wherein an axial passage extends through the rigid portion, wherein access to the axial passage is permitted by a lower opening formed by the frustoconical body of the rigid portion and a downstream axial bypass passage formed by the upper axially-extending portion of the rigid portion.

3. The valve of claim 1, wherein the portion of the surface of the frustoconical body of the rigid portion is a portion of a lower surface of the frustoconical body of the rigid portion, wherein the portion of the surface of the upper axially-extending portion of the rigid portion is a portion of an inner surface of the upper axially-extending portion of the rigid portion, wherein the portion of the surface of the frustoconical body of the deformable portion is a portion of an upper surface of the frustoconical body of the deformable portion, wherein the portion of the surface of the upper axially-extending portion of the deformable portion is a portion of an outer radial surface of the upper axially-extending portion of the deformable portion.

4. The valve of claim 1, wherein the frustoconical body of the deformable portion extends radially outwardly from a tube-shaped body of the deformable portion, wherein the frustoconical body of the deformable portion demarcates an upper axially-extending portion of the tube-shaped body of the deformable portion.

5. The valve of claim 1, wherein a tube-shaped body of the deformable portion includes an inner radial surface that defines an axial passage extending through the tube-shaped body.

6. The valve of claim 5, wherein the upper axially-extending portion is defined by an outer radial surface and an upper axial surface of the tube-shaped body, wherein the upper axial surface of the tube-shaped body connects the inner radial surface of the tube-shaped body to the outer radial surface of the upper axially-extending portion.

7. The valve of claim 1, wherein the frustoconical body of the deformable portion is defined by an outer radial surface, a lower axial surface and an upper surface, wherein the outer radial surface connects the lower axial surface of the frustoconical body of the deformable portion to the upper surface of the frustoconical body of the deformable portion, wherein the upper surface of the frustoconical body of the deformable portion is connected to the outer radial surface of the upper axially extending portion of a tube-shaped body of the deformable portion.

8. The valve of claim 1, further comprising:
a tube-shaped body of filter media defined by an inner radial surface, an outer radial surface, an upper axial surface and a lower axial surface, wherein the inner radial surface defines a passage extending through the tube-shaped body of filter media;
an upper end cap disposed adjacent the upper axial surface of the tube-shaped body of filter media; and
a lower end cap disposed adjacent the lower axial surface of the tube-shaped body of filter media;
wherein a lower axial surface of the frustoconical body of the deformable portion is disposed adjacent an upper axial surface of the upper end cap.

9. The valve of claim 8, wherein the frustoconical body of the deformable portion demarcates a lower axially-extending portion of a tube-shaped body of the deformable portion, wherein an outer radial surface of the lower-axially extending portion of the tube-shaped body of the deformable portion is disposed adjacent an inner radial surface that defines a passage extending through the upper end cap.

10. The valve of claim 8, wherein the upper axially-extending portion of a tube-shaped body of the deformable portion extends in an axial direction away from the upper end cap.

11. The valve of claim 8, wherein a lower axially-extending portion of a tube-shaped body of the deformable portion extends in an axial direction toward the lower end cap.

12. A method, comprising:
clogging filter media of a filter element with impurities for directing unfiltered fluid along a first fluid flow path toward a bypass valve assembly of the filter element that includes a deformable portion that selectively fluidly seals a rigid portion;
flowing the unfiltered fluid along the first fluid flow path through a plurality of upstream radial bypass passages formed by the rigid portion of the bypass valve assembly and into a persistent circumferential void defined by a portion of an upper surface of a frustoconical body of the deformable portion that is not disposed adjacent a portion of a lower surface of a frustoconical body of the rigid portion;
exerting a sufficient force that arises from the unfiltered fluid flowing along a second fluid flow path upon the portion of the upper surface of the frustoconical body of the deformable portion that is not disposed adjacent the portion of the lower surface of the frustoconical body of the rigid portion for causing a portion of an outer radial surface of an upper axially-extending portion of the deformable portion to deflect radially inwardly and away from a portion of an inner surface of an upper axially-extending portion of the rigid portion for selectively forming of a circumferential bypass void between the portion of the outer radial surface of the upper axially-extending portion of the deformable portion and the portion of the inner surface of the upper axially-extending portion of the rigid portion; and
flowing the unfiltered fluid along a third fluid flow path through the selectively-formed circumferential bypass void and out of a downstream axial bypass passage of the rigid portion.

* * * * *